Figure 3:
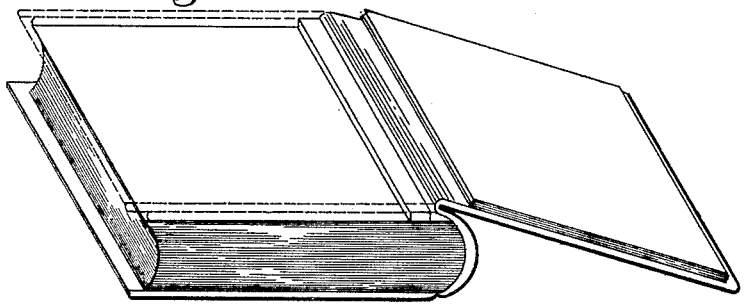

No. 675,436. Patented June 4, 1901.
V. C. BROCK.
LEDGER BALANCES INDEX.
(Application filed Jan. 31, 1900.)
(No Model.) 3 Sheets—Sheet 1.
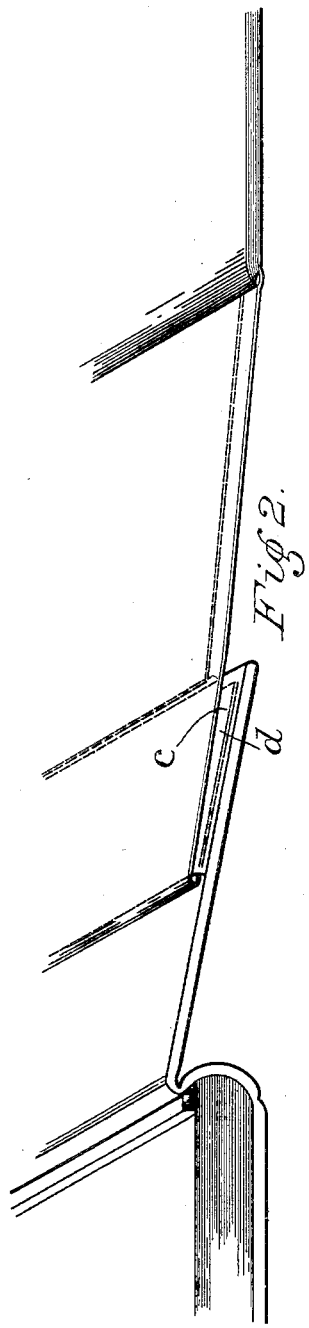
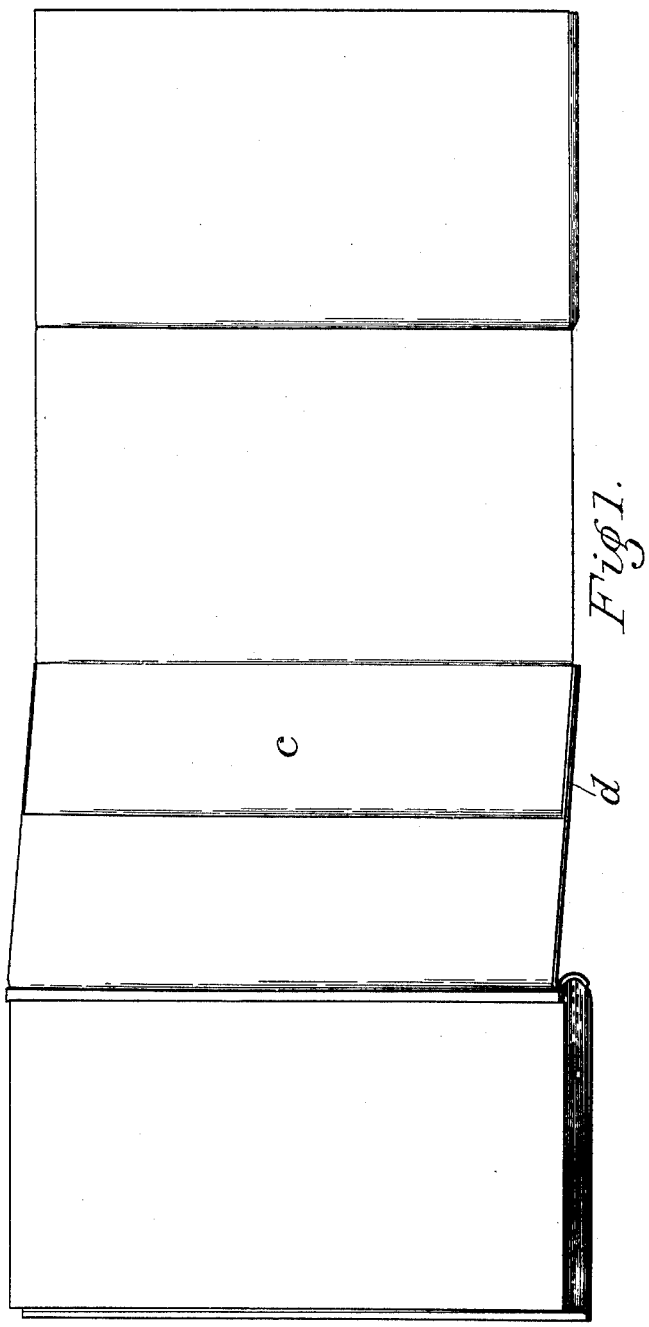
Witnesses
Inventor
Vineyard Crawford Brock
by J. Geisler
his Attorney No. 675,436. Patented June 4, 1901.
V. C. BROCK.
LEDGER BALANCES INDEX.
(Application filed Jan. 31, 1900.)

(No Model.) 3 Sheets—Sheet 2.

Witnesses
H. I. Dygert
J. H. Cunningham

Inventor
Vineyard Crawford Brock
by J. Geisler
his Attorney

No. 675,436. Patented June 4, 1901.
V. C. BROCK.
LEDGER BALANCES INDEX.
(Application filed Jan. 31, 1900.)
(No Model.) 3 Sheets—Sheet 3.

UNITED STATES PATENT OFFICE.

VINEYARD CRAWFORD BROCK, OF WASCO, OREGON.

LEDGER-BALANCES INDEX.

SPECIFICATION forming part of Letters Patent No. 675,436, dated June 4, 1901.

Application filed January 31, 1900. Serial No. 3,518. (No model.)

*To all whom it may concern:*

Be it known that I, VINEYARD CRAWFORD BROCK, a citizen of the United States, and a resident of Wasco, in the county of Sherman and State of Oregon, have invented a new and useful Improvement in Ledger-Balances Indexes, of which the following is a specification, reference being had to the accompanying drawings as a part thereof.

My invention relates to indices designed to be used in connection with the ledger kept in a bank or business-house for the purpose of recording or posting the balances which the ledger shows as to each account in the course of transactions during a certain period of time.

The objects of my invention are to obtain an index to the balance of each customer or account and to provide a complete system for checking the ledger-entries made in the current day's work or other period of time and affecting any of the accounts so kept, such system to be of dual form, in one part of which are checked up the transactions involving a group of names of customers or accounts and in the other part of which are checked up all the transactions of the entire day, to retain a complete record of the day's transactions, to have this record continuous, to introduce a system and provide the means for retaining a complete record of the preceding day's work while completing the record of the current day's work in order that one day's record may be proved by the other, and if any discrepancy appear that then the correctness of the record of either day may be examined into and verified until the error has been discovered.

The memoranda noted in the index invented by me may be intended for temporary or permanent preservation. When intending to use my index system for noting temporary memoranda, that portion of the leaves on which such temporary notes are to be posted is provided with an erasing-surface, and in that case as such erasable matter is easily blurred and effaced by the handling of the pages of the index I have provided each page with narrow raised strips or guards along their three outer edges to prevent the silicious surfaces from coming in contact with each other.

Figure 4:
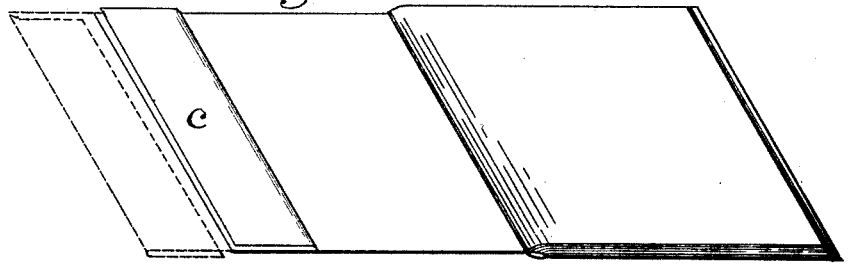
Figure 5:

All these features of my invention will be more readily understood by referring to the accompanying drawings, above referred to, the figures in which represent as follows: The first five figures illustrate some of the mechanical features incidentally used in the practice of my invention, namely:

Figure 1 shows a ledger opened at the back and having attached to the back cover my balances-index, which is opened in front and the front cover of which has a hinged folded tongue $c$ inserted in a pocket $d$ on the inside of the back cover of the ledger. In Fig. 2 the ledger and index are represented as slightly raised, so as to afford a perspective illustration of the features described as seen in Fig. 1. Fig. 3 shows perspectively a ledger and balances-index attached thereto, but folded against the back cover of the ledger, the ledger being seen as opened, the back cover also being shown by broken lines as it would appear when closed. In Fig. 4 the operation of the folded tongue hinged to the front cover of the index is illustrated. Fig. 5 represents a longitudinal section taken about through the middle of a portion of the leaves of the index and illustrates how the guards $e$ keep the surface of the index-pages apart to prevent such surfaces from rubbing against each other in the handling of the index and protect the erasable matter thereon entered against blurring and effacement. In order to show this particular mechanical construction of my invention on a sufficient scale, it was necessary to greatly exaggerate the thickness of the sheets of paper constituting the leaves of the index and of the guards $e$, mounted thereon; and in Fig. 6 I have represented the balance-index as opened, so as to disclose the first page of the index and the recapitulation-page, the intermediate leaves of the index being lifted out of the way. This figure is designed to illustrate the particular checking system for the use of which my invention was specially conceived and designed.

The letters designate the parts referred to in the description of the said drawings.

From Fig. 6 it will be observed that the first page of the index is provided with six columns, which, beginning at the left, are headed "Checks," "Deposits," "Debit-balance," "Credit-balance," "Name," (of the customer,) and "Page," (of the ledger on which the particular account is entered,) and below the headings the page is horizontally ruled or lined, providing spaces to receive the entries belonging to each particular column and relating to a particular account, and thereby segregating and arranging all the correlative memoranda or items of information in horizontal sequence. The surface of that portion of the page of the index embracing the first four columns has a silicious coating to enable the items of information posted in the said columns to be changed, so as to note the change in the account of any customer. At the bottom of the four columns I provide a number of spaces for footings, as shown, in which spaces may be inserted for the guidance of the user of the book the phrases "Credit-balance," "Subtract debit-balance," "Net credit-balance," "Add checks to this amount," and "Proof of page," or like appropriate remarks.

Those pages of my index of which the one just described is an example are provided as an index to the balances shown in the ledger in the accounts therein kept, each page relating to the accounts of a particular group of names, which names are intended to be alphabetically grouped, and such pages likewise provide the means for systematically keeping the record of the entire transaction involving such group of accounts, the net gains and losses which they represent, and the proof of the accuracy of the work or posting done, as will shortly be more fully explained.

The general mechanical structure and arrangement of the recapitulating-page is about like that of the index-pages, providing six columns, the first five of which are laid off on a silicious coating and headed: "Index-page," (for entering the number of the preceding page of the index from which the entry posted is taken,) "Check totals," "Deposits totals," "Debit-balances totals," and "Credit-balances totals." The column without any heading may be used for remarks. The horizontal ruling or lining is made to conform to the number of index-pages, and the spaces so marked off are permanently numbered to agree with the page-numbers of such index-pages, and at the bottom of the said columns I provide a number of spaces for footings, having guidance-phrases of similar import as those described of the index-pages. These recapitulation-pages are divided into two parts, each representing a day and being identical with each other in their arrangement, as apparent from the right half of Fig. 6, the object of which will be seen.

To prevent the opposite leaves from rubbing against each other, and thereby blurring and effacing the erasable memoranda entered on the silicious surface, I have provided the leaves with guards extending around the edges and consisting of narrow raised strips or ridges, which when the book is closed will operate to hold the surfaces of the leaves apart, and if the book is to be of larger size like guard-strips e may also be provided across the middle portions of the leaves, as illustrated in Fig. 5.

In describing the system for which my invention was evolved it will be well to state the arithmetical propositions of which I availed myself. Supposing the index to be used in connection with a ledger of a banking concern and that the ledger is just opened, with no entries of net balances of previous transactions to be taken into consideration, in that event the actual net balances on hand at the close of the day plus the checks paid equal the total amount which the bank received during that day and has to account for. The net balance is of course obtained by deducting the sum of the debit-balances or overdrafts from the balances which represent the sums to the credit of accounts. If there is a previous credit-balance to be taken into consideration, the present net credit-balances on hand plus the checks paid equal the sums of the amounts received by the bank and the said previous credit-balance. With this preliminary statement the practical use of my system may be demonstrated by following the entries recording a day's current work. On examining the first of the index-pages, as represented in Fig. 6, we observe the account of John Adams (a new account) and find that his account is entered at page 24 of the ledger. The transactions recorded of Mr. Adams show that he deposited $1,000 and drew checks which were presented and paid to the sum of $750, and he therefore has a balance on deposit of $250, all of which facts are properly noted in the respective columns under proper headings. William Andrews (another new account) deposited $200. His account is entered at page 25 of the ledger. He drew checks against his account for the sum of $225, thus making an overdraft of $25, all of which facts are also properly posted, as described and shown, the overdraft being noted in the debit-balance column. In like manner other persons whose names according to alphabetical arrangement are entered on this index-page make deposits and draw checks, and the facts representing the state of their respective accounts are duly posted. We will now suppose that all the entries, properly footed at the close of the day's business, will give the following totals on this page—namely, checks drawn and paid, $1,739.27; deposits, $3,882.70; debit-balance, $831.81; credit-balance, $8,700.88, the latter sum including a previous net credit-balance of $5,725.64, which it is supposed was shown by the page until changed by the record of current transactions. We know that to obtain the actual current balance the debit-balance or overdraft must be subtracted from such credit-balance, and, applying this rule, we make such subtraction and obtain as the net credit-balance of this page the sum of $7,869.07. To this we add the total checks, amounting to $1,739.27, and obtain as a result the sum of $9,608.34. We now add to the total deposits—namely, the sum of $3,882.70—the said preceding day's credit-balance of $5,725.64 and have as a result the sum of $9,608.34, which gives a proof of this page, the two final sums as above given being equal. In like manner the work of the day for each page of the index is completed and proved. Then the totals of the first index-page are carried forward to the recapitulating-page and placed in their respective columns opposite the number of the index-page, and in the same manner all remaining index-pages are likewise posted. Thereupon all the columns of the recapitulating-page are footed, and the following totals for the day's work are found, to wit: total checks, $13,225.50; total deposits, $16,576.35; total debit-balance, $1,463.25; total credit-balance, $186,275.75. Subtracting the total debit-balance from the total credit-balance gives as a net credit total-balance the sum of $184,812.50. Adding to this the sum of total checks—namely, $13,225.50—gives the sum of $198,038. Now to the total deposits, being the sum of $16,576.35, we add the preceding day's total net credit-balance, which was the sum of $181,461.65, and obtain the sum of $198,038, which, being equal to the other final sum, proves the day's work as correct. As seen in Fig. 6, we have considered the record of the transactions had for the 15th day of November. When the transactions for the next day are entered, the entries on the index-page are changed as the facts require; but the records of the totals of each page of the index is preserved while making up the records of the totals for the next day, which next day, as a matter of fact, is the current business day, while the preserved records represent the preceding business day. The improved feature of the recapitulating-page in connection with the index portion of the book is found in retaining the preceding day's work intact until the present day's work is fully completed, and if by chance any error is made on one side of the general balance and another error is made on the other side of equal amount and the first day thus erroneously balanced the second or present day's work would fail to balance, and having erased the intermediate memoranda in the preceding leaves we have no other place to obtain the complete transactions of the preceding day than the memoranda thereof on this particular page. This memoranda, however, being preserved complete in itself without a single erasure until the present day's work is itself finished one can thus refer to the preceding day's work in any of its part if there are any discrepancies until the same have been fully corrected and correct balances obtained for two days' consecutive work, and in this wise a reliable system of checking up the work is followed with but little extra effort.

The provision of an erasing-surface for the leaf or leaves of my index is optional, as already mentioned. Indeed, it may be considered preferable for certain classes of work or purposes to retain the memoranda entered on all the sheets or that entered on the recapitulating-sheet. When the noted matters are intended to be preserved, ordinary sheets of paper suitably ruled, so as to be adapted to the use specified, is all that is required; and I do not wish to be understood as stating that the ledger-balances sheets and the recapitulating-sheets are under all circumstances to be permanently united mechanically, as such is not required. For my system it is, however, essential that both ledger-balances sheets and recapitulating-sheets be provided, so that they may be used in combination with each other in accordance with the above-described system.

Having thus fully described my invention, now what I claim, and desire to secure by Letters Patent, is—

1. In a ledger-balances index, the combination of the ledger-balances leaves vertically ruled to present columns for debit and credit items, and debit and credit balances, names, and ledger-page numbers, and horizontally ruled, to segregate and arrange in horizontal sequence, all the correlative memoranda, or items of information; that portion of the surface of said sheets designed for the debit and credit memoranda being faced or coated with a silicious, or other material to render such memoranda erasable; and a recapitulating-sheet on which to recapitulate, or summarize, the debit and credit memoranda entered on the said other leaves, such recapitulating-sheet being vertically ruled to present columns corresponding with those provided on the ledger-balances leaves for the debit and credit memoranda, and an additional column in which to enter the number of the pages of the index summarized, and being horizontally ruled to correspond with the pages of the preceding set of ledger-balances leaves, and arrange all the footings, or transferred information, in horizontal sequence, substantially as described.

2. In a ledger-balances index, the combination of the ledger-balances leaves vertically ruled to present columns for debit and credit items, and debit and credit balances, names, and ledger-page numbers, and horizontally ruled to segregate and arrange in horizontal sequence, all the correlative memoranda, or items of information; that portion of the surface of said sheets designed for the debit and credit memoranda being faced or coated with a silicious, or other material to render such memoranda erasable; and a recapitulating-sheet on which to recapitulate or summarize the debit and credit memoranda entered on the said other leaves, such recapitulating-sheet comprising two parts or divisions, each of which is vertically ruled to present columns corresponding with those provided on the ledger-balances leaves for the debit and credit memoranda, and an additional column in which to enter the number of the pages of the index summarized, and being horizontally ruled to correspond with the pages of the preceding set of ledger-balances leaves, and arrange all the footings, or transferred information, in horizontal sequence, substantially as described.

3. In a ledger-balances index, the combination of the ledger-balances leaves vertically ruled to present columns for debit and credit items and debit and credit balances, names, and ledger-page numbers, and horizontally ruled to segregate and arrange in horizontal sequence, all the correlative memoranda, or items of information; that portion of the surfaces of said sheets designed for the debit and credit memoranda being faced or coated with a silicious, or other material, to render such memoranda erasable; and a recapitulating-sheet on which to recapitulate, or summarize the debit and credit memoranda entered on the said other leaves, such recapitulating-sheet being vertically ruled to present columns corresponding with those provided on the ledger-balances leaves for the debit and credit memoranda, and an additional column in which to enter the number of the pages of the index summarized, and being horizontally ruled to correspond with the pages of the preceding set of ledger-balances leaves, and arrange all the footings, or transferred information, in horizontal sequence; that portion of the surface of said recapitulating-sheet designed for the debit and credit memoranda being also faced, or coated, with a silicious, or other material, to render such memoranda erasable, substantially as described.

4. In a ledger-balances index, the combination of the ledger-balances leaves vertically ruled to present columns for debit and credit items, and debit and credit balances, names and ledger-page numbers, and horizontally ruled to segregate and arrange in horizontal sequence all the correlative memoranda, or items of information; that portion of the surfaces of said sheets designed for the debit and credit memoranda being faced, or coated, with a silicious, or other material, to render such memoranda erasable; a recapitulating-sheet on which to recapitulate, or summarize, the debit and credit memoranda entered on the said other leaves, such recapitulating-sheet being vertically ruled to present columns corresponding with those provided on the ledger-balances leaves for the debit and credit memoranda; and an additional column in which to enter the number of the pages of the index summarized, and being horizontally ruled to correspond with the pages of the preceding set of ledger-balances leaves, and arrange all the footings, or transferred information, in horizontal sequence; that portion of the surface of said recapitulating-sheet designed for the debit and credit memoranda being also faced, or coated, with a silicious or other material, to render such memoranda erasable, and the said leaves being provided with guards, or raised ridges, operating to keep their opposed faces apart, and thereby prevent the erasable memoranda thereon written from becoming blurred, or effaced, substantially as described.

In testimony whereof I have hereunto affixed my signature, in the presence of two witnesses, this 21st day of November, 1899.

VINEYARD CRAWFORD BROCK.

Witnesses:
L. D. HENDERSON,
T. J. GEISLER.